O. W. JOHNSON & E. A. SCOTT.
INK ERASER.
APPLICATION FILED SEPT. 26, 1907.
899,539.
Patented Sept. 29, 1908.
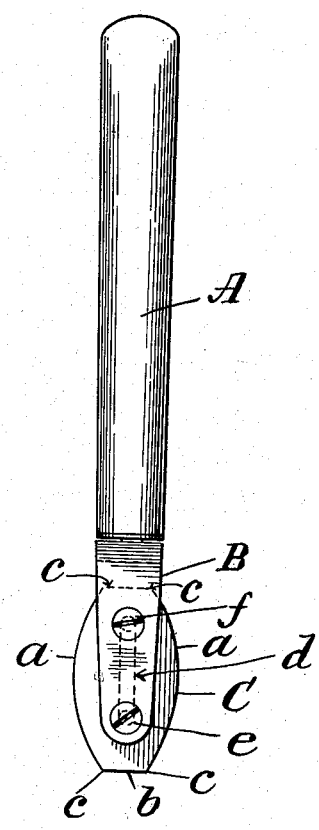
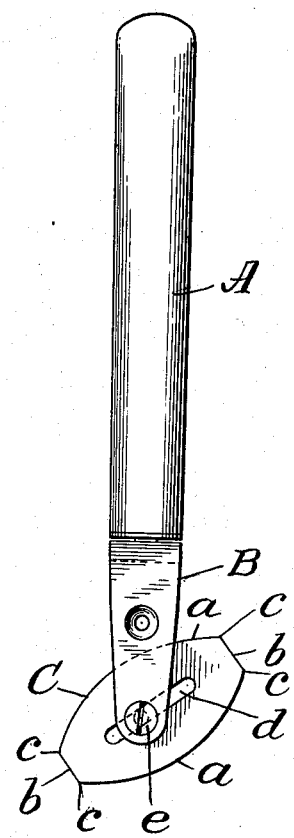

UNITED STATES PATENT OFFICE.

OSCAR W. JOHNSON, OF ALLENDALE, NEW JERSEY, AND EDWIN A. SCOTT, OF NEW YORK, N. Y.

INK-ERASER.

No. 899,539.　　　Specification of Letters Patent.　　　Patented Sept. 29, 1908.

Application filed September 26, 1907. Serial No. 394,654.

*To all whom it may concern:*

Be it known that we, OSCAR W. JOHNSON, a citizen of the United States, and a resident of Allendale, county of Bergen, and State of New Jersey, and EDWIN A. SCOTT, a subject of His Britannic Majesty, and a resident of Brooklyn borough, New York city, and State of New York, have invented certain new and useful Improvements in Ink - Erasers, of which the following is a specification.

The object of our invention is to provide an improved ink eraser in which there is a removable and reversible cutting blade, and in which the cutting blade is of peculiar formation so as to present more than one cutting point in addition to more than one cutting edge.

Broadly speaking, our invention consists in an eraser provided with a removable and reversible blade having a slot cut lengthwise of the blade, which will allow the blade to be pulled out part-way and reversed in the fork or handle without removing the blade, and which will also permit the easy removal of the blade entirely so that a fresh blade may be inserted when the first blade is worn on all of its cutting edges. The blade itself is provided with truncated ends so that two cutting points are available at each end of the blade, one at each end of the cutting edge.

The means by which the blade is detachably and firmly held within the fork or handle may be varied as desired. We prefer screws which pass through the slot of the blade in such a manner that one of them has to be removed to allow the blade to be reversed, and both have to be removed to allow a fresh blade to be substituted.

One form of our invention is shown in the accompanying drawing in which:

Figure 1 is a front elevation. Fig. 2 is a similar elevation with the blade in the act of reversing.

Same letters indicate similar parts in the different drawings.

A is the handle of the eraser and terminates in a fork B.

C is the eraser blade formed with two side cutting edges $a$, $a$, and two straight end cutting edges $b$, $b$, the extremes of which $c$, $c$, serve as cutting points, while the cutting edges serve as the usual scraping edges. This blade is provided with a longitudinal slot $d$, of sufficient length to permit the blade to reverse upon the forward fastening point $e$, which, in this case for convenience, is a screw as shown in Fig. 2. The other fastening point $f$, serves to hold the blade from turning when in position as shown in Fig. 1, and as above stated, has to be removed when it is desired to reverse the blade and use the other cutting edge and cutting points when those at one end of the blade have dulled.

As before stated, the special character of fastening device is unimportant.

We claim:

An improved ink eraser which consists of a handle having a forked end, a slotted blade, removably and reversibly set in said fork and fastening devices set in said forked end and adapted to pass through said slotted blade whereby the removal of one of which permits the reversal of the blade, while the removal of both permits the entire removal of the blade for resharpening.

OSCAR W. JOHNSON.
　　　　　　　　EDWIN A. SCOTT.

Witnesses:
　HORATIO A. CLARK,
　HY. W. LETCHER.